United States Patent [19]

Welker

[11] 4,175,591

[45] Nov. 27, 1979

[54] APPARATUS FOR DISTRIBUTING SLURRIES

[75] Inventor: Merrill Welker, Denver, Colo.

[73] Assignee: Humphreys Engineering Company, Denver, Colo.

[21] Appl. No.: 832,421

[22] Filed: Sep. 12, 1977

[51] Int. Cl.² .......................................... G01F 11/32
[52] U.S. Cl. .................................. 137/883; 222/108; 222/504; 222/426; 137/262; 137/885
[58] Field of Search ........................ 222/41, 42, 47, 49, 222/108, 129, 130, 135, 425, 426, 431–433, 442, 443, 478, 482, 488, 504, 559, 606, 607, 564, 460, 462, 330; 137/262–264, 883, 885

[56] References Cited

U.S. PATENT DOCUMENTS

| 551,860 | 12/1895 | Hale | 222/108 |
|---|---|---|---|
| 2,569,085 | 9/1951 | Wood et al. | 222/504 |
| 3,202,167 | 8/1965 | Young et al. | 137/264 |
| 3,235,141 | 2/1966 | Couffer | 222/482 |
| 3,358,719 | 12/1967 | Minard | 222/108 |

Primary Examiner—Stanley H. Tollberg
Assistant Examiner—H. Grant Skaggs
Attorney, Agent, or Firm—Edwin L. Spangler, Jr.

[57] ABSTRACT

This invention relates to an improved stationary slurry distributor characterized by a centrally-located standpipe to receive the incoming slurry, a multi-apertured manifold at the base of the standpipe for continuously distributing the contents of the latter into a plurality of separate compartments bordering the periphery thereof, outlets in the bottom of each compartment, stopper-type valves independently operable to plug one of the outlets, and at least one overflow port in the side of each compartment arranged in misaligned relation to the inlet and slurry stream issuing therefrom, these ports being effective to both prevent the escape of the slurry therethrough when the outlet is open and, alternatively, bypass the flow when the outlet from the compartment is closed so as to not increase the flow into and through the other compartments then in use. The invention also encompasses the novel mechanism for guiding the stopper valve during its excursions between open and closed positions that also provides a subassembly for maintaining it in coaxial alignment with its seat. An adjustable coupling also connects each valve to its actuator for effecting axial adjustment of the valve relative to its seat. The invention also encompasses the novel flow control method which includes the step of bypassing the input into any compartment with its outlet closed so as to not increase the flow into those with open outlets.

19 Claims, 6 Drawing Figures

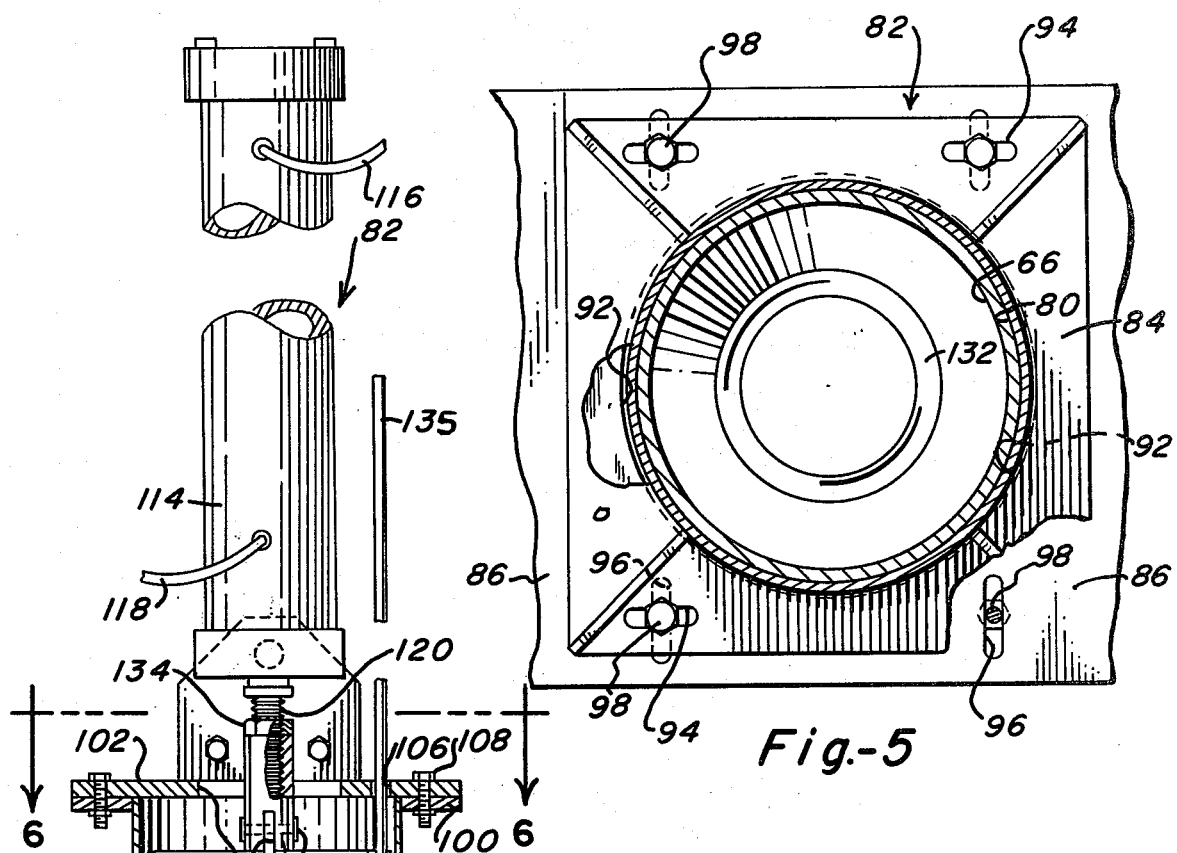
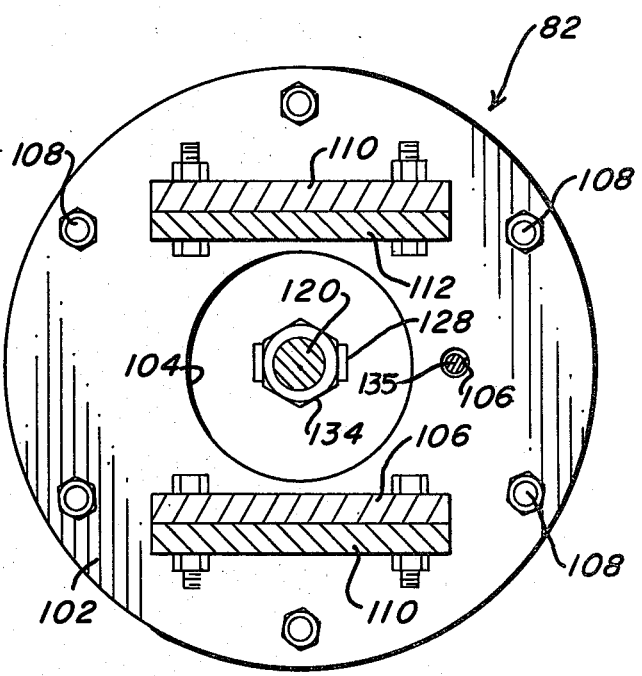
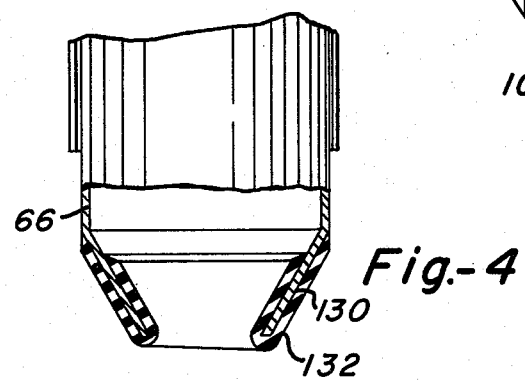
Fig.-4
Fig.-5
Fig.-6

APPARATUS FOR DISTRIBUTING SLURRIES

Slurry distributors are widely used in industry as a means for supplying two or more, usually several, downstream processing lines with a thoroughly mixed uniform product from a common source thereof. There are basically two different types of slurry distributors, the first being the so-called rotating type which does not concern us here and the second, or fixed type, to which the instant invention relates.

The essential features of any slurry distributor are, first of all that of dividing the input into two or more equal portions, the number and volume of which may vary from time-to-time depending upon the downstream requirements as well as the capability of the various processing lines to accommodate a given flow rate. In other words, a single line is seldom, if ever, able to handle the entire input, otherwise, no distributor is needed.

The second basic requirement is that each of the several portions of the slurry delivered to the various downstream lines be of uniform consistency, i.e. the same mix, density, etc. as existed in the original slurry before it was divided up. In the fixed or stationary distributor described herein, this is best accomplished by delivering the feed to the bottom of the distributor through a vertical pipe 6 to 8 diameters long.

When the distributor is top fed, the mixing action of the slurry rising through a vertical pipe is not obtainable and must be accomplished by the turbulence generated in dissipating part of the stream's energy in junction boxes, tee fittings, orifices or abrupt enlargements.

Finally, the distributor must be capable of dividing the input into equal divisions all of which reach their respective discharge apertures at essentially the same velocity. Equality of division as well as equal output velocities in each stream are functions of the hydraulic parameters of the system in relation to the specific equipment through which it moves.

The prior art slurry distributors of the stationary type differ from one another in mechanical detail; however, they most generally include some kind of so-called riser pipe into which the incoming slurry is pumped or otherwise introduced. A standpipe extends on up above the riser pipe and functions as a miniature reservoir within which the slurry accumulates and is mixed. It also provides the necessary head over the distribution orifices located near the bottom thereof that cooperate to pass the slurry from the standpipe into individual open-topped compartments grouped around its periphery. If operating correctly the slurry level in each compartment should never be allowed to rise above the center of the orifice in the standpipe, otherwise, it will impede the flow from the aforesaid orifice. This is so regardless of the incoming feed volume. In other words, plugging up the outlet in one or more of the compartments will, of necessity, increase the flow rate through the others assuming a constant feed rate. Stopper valves, to which more attention will be given presently, plug the outlets from each compartment and cooperate with one another to distribute the slurry to the various downstream locations for further processing or whatever else, if anything, is done to it.

Top-fed stationary distributors are also used in certain installations although they are more difficult to control than the bottom-fed type. Their basic structural difference is a downspout delivering the slurry from overhead into the bottom of a blocked-off standpipe which provides the miniature reservoir much like it does in the bottom-fed version. The problems arise in having to keep the downspout completely full at all times, the slurry thoroughly mixed and to dissipate some of the kinetic energy of the slurry before it is delivered to the various compartments. Despite its problems, the top-fed stationary distributor continues to be a significant piece of slurry-handling equipment.

Up until about two years ago, these stopper valves consisted of nothing more than a wooden, rubber or plastic plug inserted into the outlet much like a sink stopper. Most such valves had some kind of extension by means of which it could be manually or mechanically actuated from a remote position above a given compartment. All too often, unfortunately, such plugs stuck in the outlet, became buried in sand or other sedimentary materials, or otherwise became difficult to remove. These problems led to the development by applicant of an improved stopper valve which was tubular instead of solid. It also had a tapered lower end and to the exterior surface of which was added a coating of elastomeric material. This improved version of the stopper valve proved to be a valuable addition to the stationary distributor art, especially those designed for large installations, because it was easily actuated, simple to service and maintain, and almost never stuck. There remained, however, a number of other problems that had yet to be solved. The instant invention relates to the solutions to the latter problems.

The first of these problems that needed to be solved was that of more precise flow control through the distributor, especially in those instances where circumstances demanded that the total number of compartments operating at a particular time be reduced. The net result in such circumstances was, of course, the necessity for dividing up the flow from those compartments taken out of the distribution pattern among those left in or brought in. If nothing more, the lines remaining operative were forced to handle an increased flow which, all too often, overloaded downstream equipment. In some instances, for example, if more than half of the outlets were shut off, the flow would exceed the capacity of the remaining outlets causing an overflow condition, and spillage from the distributor, downstream equipment or slurry handling lines.

The increase in the number of operative compartments could, likewise, cause problems due to the resultant decrease in flow rates; however, at least as far as the distributor was concerned, this was the easier of the two to handle notwithstanding the downstream processing problems it might cause. In accordance with the teaching of the instant invention, it has now been found that the foregoing problems of flow control can be handled by the simple, yet unobvious, expedient of providing each compartment with an auxiliary bypass means in the sidewall thereof while, at the same time, carefully designing the size and location of this bypass means in relation to both the inlet from the standpipe and the outlet from the compartment so thus accommodating the desired range of volumes without flooding said inlet. By so doing, the material entering an unused compartment is shunted off, usually to be recycled, and it does not effect the flow rate in any of the other compartments one way or another.

The several bypass ports must effectively cooperate with one another and with the compartment walls to drain off the slurry from the unused compartments before it can build up to a level where it will interfere with the flow entering same. Also, and of utmost importance, is the fact that each bypass port must be misaligned relative to the orifice through which the slurry enters the compartment so that, when the normal bottom opening discharge is unplugged, a portion of the incoming slurry will not splash or otherwise exit through the bypass thus leaving the downstream equipment short of its anticipated flow.

Accordingly, the improved distributor design enables the operator to shut off one or all of the outlets bypassing part or all of the normally used downstream equipment, without affecting the rate of flow of the main stream. Thus, in a complex plant the operation of upstream equipment remains unaffected and that of the downstream remains unaffected except for the units bypassed.

The remaining improvements have to do with the stopper valves, particularly, the guidance systems therefor and the adjustable features by means of which they can each be individually positioned to mate properly with their respective seats in the bottom of the compartment. A marginally-flanged guide tube adjustably fastens to a header and telescopically houses the valve in coaxial relation to its seat. An axially-adjustable coupling between the valve and its actuator provides the means for establishing and maintaining the proper seating pressure necessary to produce a fluid-tight seal without, at the same time, damaging the seat.

It is, therefore, the principal object of the present invention to provide a novel and improved stationary slurry distributor.

A second objective is to provide a device of the type aforementioned which includes means effective to insure balanced and uniform flow rates from each compartment.

Another object of the within described invention is the provision of an improved independent guidance system for each of the several stopper valves that cooperates with the adjustable features thereof to insure a quick opening fluid-tight closure.

Still another object of the invention herein disclosed and claimed is to provide an overflow in each compartment effective to bypass the entire input thereto when the main outlet is closed yet, when the latter is open, insure the delivery thereto of all that enters.

An additional object is the provision of independent means associated with each stopper valve effective to shift same both laterally and axially so as to line it up with its seat as well as form the proper seal therewith.

Further objects are to provide a stationary slurry distributor of either the bottom or top-fed type which is simple, versatile, rugged, dependable, easy to service and maintain, compact, efficient, and even somewhat decorative.

Other objects will be in part apparent and in part pointed out specifically hereinafter in connection with the description of the drawings that follows, and in which:

FIG. 4 is a still further enlarged elevational view showing the valve, mounting and actuator therefor, portions of which have been broken away and shown in section while others have been similarly broken away to conserve space or better reveal the interior construction;

FIG. 5 is a section taken along line 5—5 of FIG. 4 with certain portions broken away to reveal the structure therebeneath; and, FIG. 6 is a section taken along line 6—6 of FIG. 4.

Figure 1:
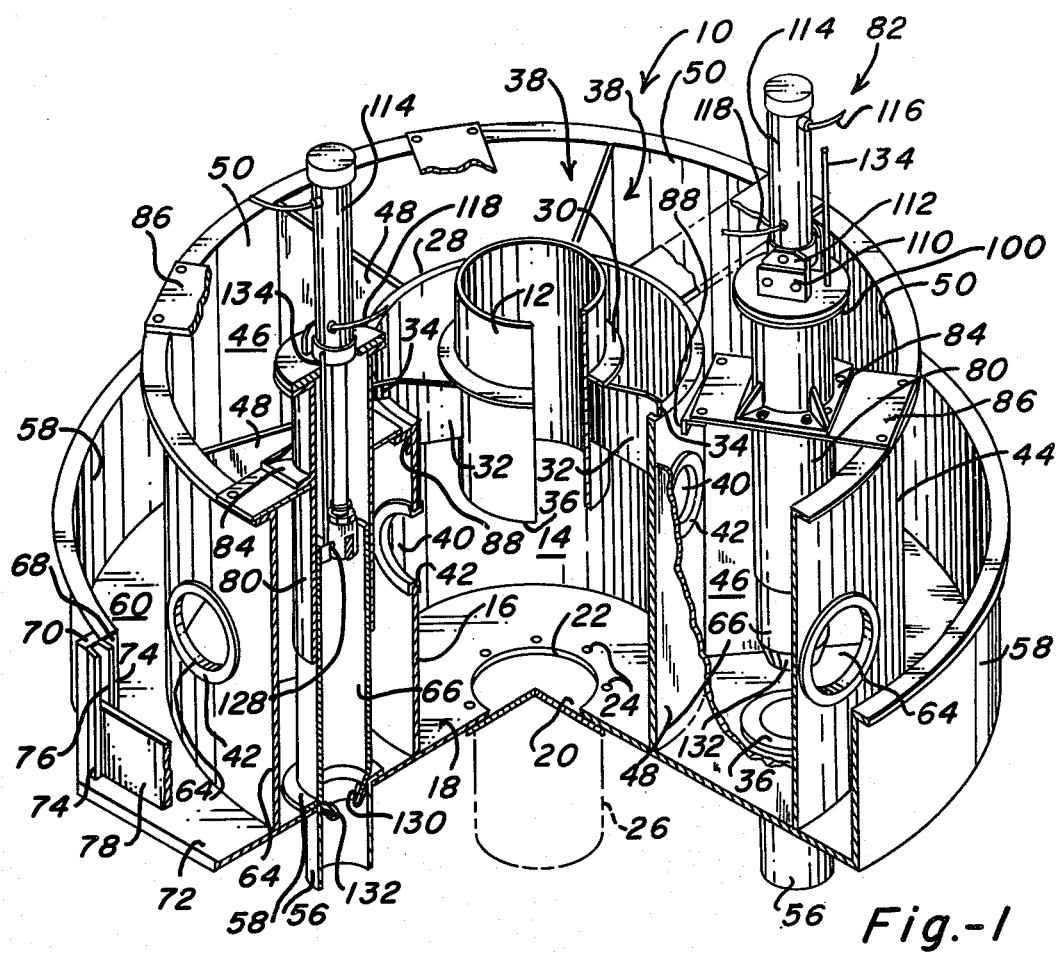
FIG. 1 is a perspective view of a top-fed slurry distributor, approximately a quarter of which has been broken away and shown in section while other parts have been broken away to better reveal the interior construction.
Figure 2:
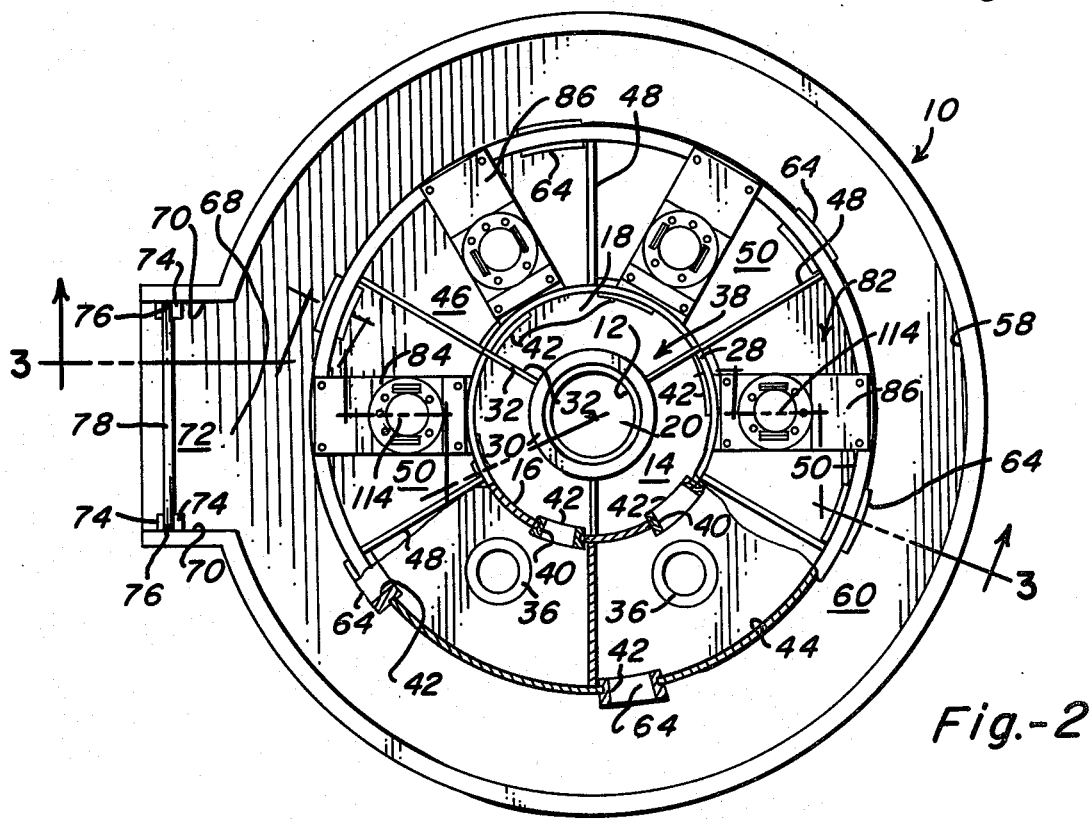
FIG. 2 is a top plan view to the same scale as FIG. 1.
Figure 3:
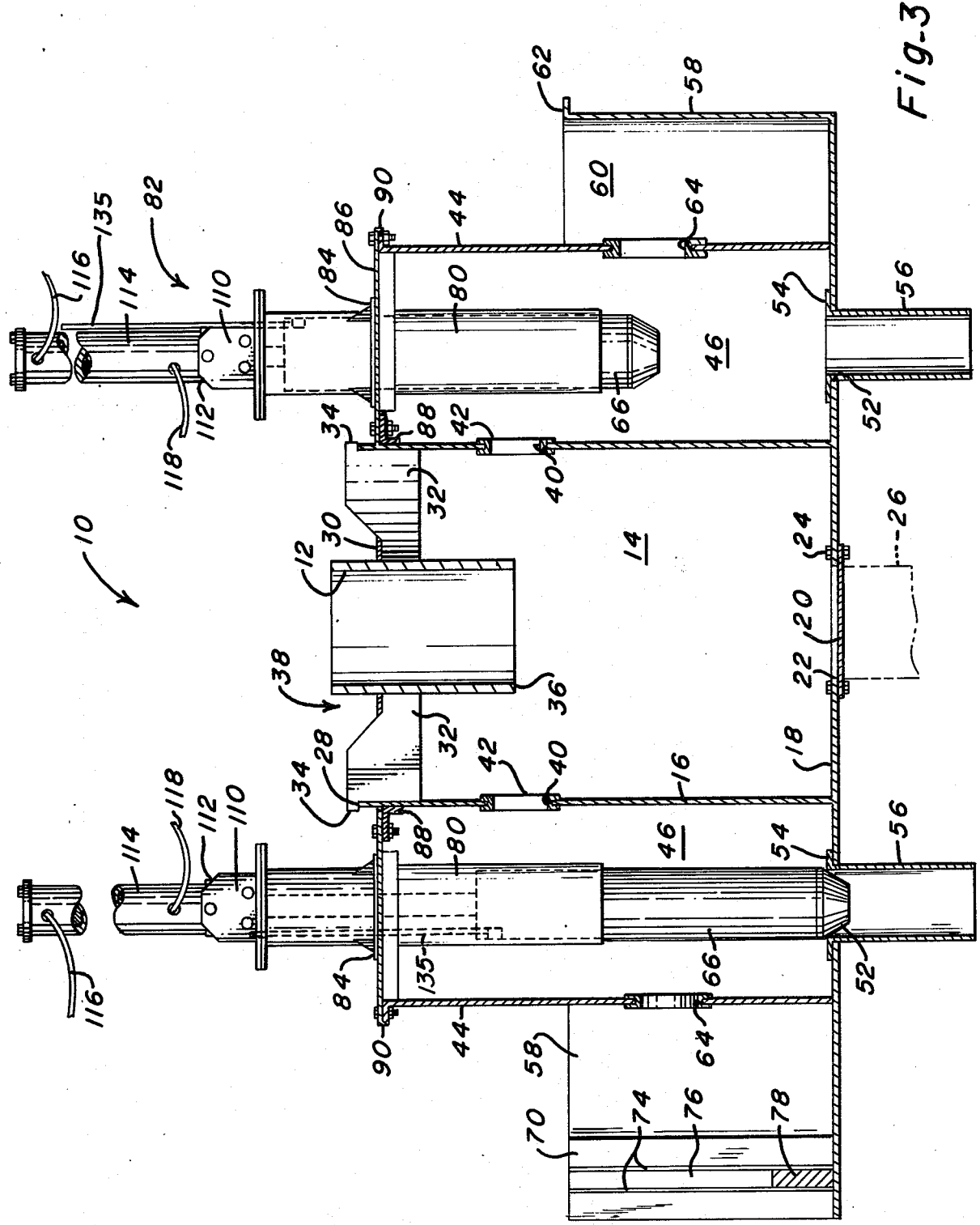
FIG. 3 is a vertical section to an enlarged scale taken along line 3—3 of FIG. 2, certain portions having been broken away to conserve space.

Referring next to the drawings for a detailed description of the present invention and, initially, to FIGS. 1, 2 and 3 for this purpose reference numeral 10 has been selected to broadly designate the stationary slurry distributor of the present invention which will be seen to include in the particular form illustrated a downspout 12 through which the slurry to be distributed enters the distributor and, specifically, the chamber 14 defined by standpipe 16 and the bedplate 18 along with coverplate 20 that cooperate with one another to close off the bottom thereof. Bedplate 18 extends well out beyond the margins of the standpipe and functions as the bottom wall of the entire distributor. It also contains a centrally-located opening 22 therein which is closed by the coverplate 20 that is removably fastened to the underside thereof by fasteners 24.

In those instances where the distributor is to be bottom-fed instead of top-fed, coverplate 20 is removed and a riser pipe 26 shown in phantom lines in FIGS. 1 and 3 is used in place of downspout 12 which is not needed. Modification of the distributor to accommodate bottom or top-fed slurry inputs is old in the art and forms no part of the present invention. The particular way in which the downspout is supported "lampshade fashion" upon the upper rim 28 of the standpipe is, however, probably different from the way this has been done before. The downspout is bordered on the outside by a peripheral flange 30 underneath which are permanently fastened three or more substantially equiangularly-spaced radially-extending webs 32 that bridge the opening between said downspout and standpipe while including tongues 34 that overhang the rim 28 of the latter. These tongued webs 32 thus support the downspout in essentially coaxial relation within the interior of the standpipe. It has been found that the distance separating the bedplate 18 of the standpipe and the lower end 36 of the downspout should be at least two or three times the diameter of the downspout in order to dissipate some of the kinetic energy of the incoming slurry which flows in at a rate calculated to keep it full. The downspout subassembly which has been broadly indicated by numeral 38 and which includes the downspout itself along with its flange and tongued webs will, therefore, be seen to be completely removable.

The wall of the standpipe includes a plurality of angularly-spaced ports 40, all of which are of the same size, shape and height above bedplate 18. In the particular form shown, each of the aforesaid orifices or ports 40 is rimmed by a rubber gasket 42. A large diameter cylindrical ring 44 surrounds the standpipe in concentric spaced relation thereto cooperating therewith to define open-topped annular chamber 46. Between adjacent orifices or ports 40 is placed a radially-extending partition wall 48 (FIGS. 1 and 2) that divides the interior of annular chamber 46 into a plurality of individual compartments 50, all of which are of the same shape and size due to the identical nature of the partition walls and their equiangularly-spaced relation to one another.

That portion of bedplate 18 that bridges the gap between the standpipe 16 and ring 44 thus forming the bottom wall of annular chamber 46 as well as the compartments 50 thereof, includes outlet openings 52 (FIG. 3) rimmed by valve seats 54 which comprise marginal flanges on the upper end of discharge tubes 56. Once again, these openings 52 are all of exactly the same size and shape so that the flow rate of the slurry therethrough and out of each compartment will be uniform. While it is not essential for functional purposes, as a practical matter the inlets into and the outlets out of each chamber are preferably in the selfsame location since no useful purpose is served by doing otherwise.

Bordering ring 44 in spaced relation on the outside thereof is yet another split ring 58 which, once again, mounts atop bedplate 18 cooperating therewith and with ring 44 to define an open-topped annular overflow trough 60. The upper margin of split ring 58 is flanged as indicated at 62 in the particular form shown and it terminates at a height just slightly above the top of overflow ports 64 in the ring 44 that communicate the interior of each compartment 50 and remove a portion of the slurry therefrom whenever the discharge tube 56 therein is plugged by stopper valves 66 that will be described in detail presently.

The gap 68 left by the split in ring 58 is provided with transversely-spaced upstanding wall members 70 that rest atop extension platform 72 of the bedplate and are fitted with members 74 defining opposed vertical channels 76. Within this channel is mounted a removable dam 78, the height of which can be varied by using different size inserts.

Now, the relationship of openings 40 and 64 with respect to one another in each chamber 46 is important because with valve 66 open, no significant portion of the incoming slurry can be permitted to escape through the overflow 64 into the trough 60 thereby bypassing the discharge 56 which connects to the downstream processing equipment (not shown). In other words, each operative chamber, i.e. those with their valves 66 open, must be depended upon to deliver its full share of the slurry to the downstream processes if the latter are to function as intended at their predicted level of efficiency. In order to prevent the unintentional escape of some of the incoming slurry through overflow opening 64 when the discharge 56 is open, said overflow is misaligned with respect to the intake port 40 by being angularly offset relative to one another. In the particular form shown in FIG. 2, intake ports 40 are all shown shifted in a counterclockwise direction from a centered position within their respective compartments while overflow ports 64 are shifted clockwise. As illustrated, this angular offset has been exaggerated for purposes of illustration beyond that which is necessary to accomplish the desired end, namely, the prevention of any substantial amount of the incoming slurry from bypassing the discharge and escaping through overflow port 64.

It should also be noted that by interposing valve 66 along with the guide tube 80 therefor between the inlet and overflow ports 40 and 64, respectively, a mechanical obstruction is provided that is effective to further prevent the direct passage of slurry therebetween. While the latter arrangement is, by no means, essential if the ports are angularly offset as shown, it does further insure that no significant amount of slurry will bypass the open discharge opening in the bottom of the chamber.

Ports 40 and 64 are also shown vertically misaligned, the intake port being the higher of the two. Such misalignment has little, if any, significant effect upon the problem solved by the angular displacement and is not done for this purpose at all. Instead, the height of the orifices 40 in the standpipe is chosen primarily to insure that the slurry is relatively quiescent, yet thoroughly mixed and homogeneous as it enters the various distribution compartments. Bypass or overflow ports 64, on the other hand, are placed at a level effective to control the level of bypassed slurry within trough 60. Along this same line it is also important to recognize that the height of dam 78 is always less than the bottom edge of port 64 as bordered by gasket 42 so that no slurry in trough 60 exiting an inoperative chamber with its discharge 56 closed can re-enter another chamber that is in use.

Next, referring to all six figures of the drawing but most particularly FIGS. 4, 5 and 6, the stopper valve subassembly which has been indicated broadly by reference numeral 82 will be set forth in detail. Vertically-disposed guide tubes 80 houses the stopper valve 66 for telescopic movement therein between an extended position seated within discharge tube 56 as shown at the left in FIGS. 1 and 3, and its retracted position shown at the right in these same figures along with FIG. 4.

Radial flanges 84 border guide tubes 80 intermediate the ends thereof and rest atop mounting plates 86 that bridge the open top of each chamber 46 between brackets 88 fastened to the outside wall of the standpipe and the marginal flange 90 bordering the rim of ring 44. These mounting plates each have an oversize opening 92 therein (FIG. 4) adapted to receive the guide tube for limited horizontal adjustment necessary to place the axis of valve 66 precisely on the axis of the discharge tube 56 so that the former will seat and seal properly against the latter.

As illustrated in FIG. 5, flange 84 is shown provided with more or less radially-extending fastener-receiving slots 94 while the mounting plate therebeneath has similar slots 96 extending essentially tangentially or at right angles thereto. Such crossed slots, of course, cooperate with one another in the well-known manner to permit limited relative horizontal adjustment of the guide tube and associated mechanisms supported thereon as well as housed therein with respect to the axis of discharge tube 56. Bolts 98 secure the flange to the mounting plate in adjusted position.

Looking next at FIGS. 1–3, 4 and 6, it will be seen that guide tube 80 also carries a second radial flange 100 bordering the rim thereof atop which is mounted the valve actuating mechanism. It consists of a baseplate 102 having both a central opening 104 and an indicator rod opening 106 therein, the latter being positioned closely adjacent the inside surface of the guide tube. Fasteners 108 detachably fasten the baseplate to flange 100 of the guide tube as shown.

Horizontally-spaced parallel ears 110 extend vertically from baseplate 102 from positions on opposite sides of central opening 104 therein. These ears bolt onto similar ears 112 spaced to fit therebetween that comprise parts of a mounting bracket on the lower end of double-acting pneumatic servomotor 114. Servomotor 114 is of conventional design and is fitted with air lines 116 and 118 connected to a source of compressed air (not shown). A single-acting servomotor can, of course, be used to lift and open valve 66 connected thereto while allowing it to close by gravity alone or, perhaps, spring assisted. Such details form no part of the present invention and are well within the skill of the ordinary artisan.

With specific reference to FIGS. 4 and 6, the piston rod 120 is connected to the piston (not shown) of servomotor 114, rotates freely within the cylinder housing the latter, is threaded and screws into internally-threaded tubular coupling 122. The lower end of this coupling is slotted as shown in FIG. 4 at 124 to receive diametrical plate 126 fastened across the top end of tubular valve 66. A traversely-extending pivot pin 128 pivotally attaches connector 122 to plate 126 so that valve 66 is free to swing pendulum-like with the confines of guide tube 80 as it telescopes up and down therein. The threaded connection between coupling 122 and piston rod 120 provides the axial adjustment necessary upon rotation of the latter to insure that the padded frustoconical end 130 of valve 66 seats properly within the neck of discharge tube 56 yet does not damage the rubber sheath 132 covering the latter. A lock nut 134 maintains the adjusted relation between valve 66 and the actuating mechanism 82 therefor.

Finally, with brief reference to FIGS. 1, 5 and 6, it will be seen that the valve 66 consists of nothing more than a metal tube or pipe having a frustoconical lower end 130 which is open at all times. In the preferred embodiment shown, this tapered end is covered by a rubber sheath 132 which is vulcanized thereon. Such a valve seats securely in the neck of discharge tube 56 and forms a fluid-tight seal therewith in much the same manner as a sink stopper. More significant, however, is the ease with which the valve is opened even though the chamber in which it operates is filled with sand or other sedimentary materials.

These valves are, of course, essentially hidden inside their respective guide tubes and, therefore, the operator has a difficult time telling whether they are open or closed. Each valve is thus provided with an indicator rod 135 which extends up through opening 106 in the baseplate at all times and provides a visual indication of the state of each valve.

What is claimed is:

1. A stationary slurry distributor which comprises: a horizontally-disposed base; first wall means supported on said base cooperating therewith to define an open-topped reservoir effective to receive and retain a slurry delivered thereto; second wall means surrounding said first wall means in spaced relation outside thereof cooperating therewith and with said base to define a chamber encircling said reservoir; partition walls dividing the interior of said chamber into a plurality of individual compartments; the portions of said base underlying each compartment having a discharge opening therein, the portions of said first wall separating each compartment from the reservoir containing an inlet opening, the portions of said second wall within each compartment containing bypass means, and said bypass means and inlet opening within each compartment being angularly-offset relative to one another such that the slurry entering said compartment from the reservoir will essentially all leave the latter through said discharge opening when it is open; and, stopper-type valve means within each compartment selectively and independently operable to plug and unplug the discharge opening therein.

2. The slurry distributor as set forth in claim 1 in which the bypass means comprise openings sized relative to said inlet openings so as to handle the entire flow entering through the latter.

3. The slurry distributor as set forth in claim 1 which includes trough-forming means surrounding the second wall in position to receive and collect the slurry exiting any compartment through the bypass means therein upon plugging of at least one of the discharge openings.

4. The slurry distributor as set forth in claim 1 wherein all the inlet openings are of essentially the same size and shape and are spaced above the base the same distance.

5. The slurry distributor as set forth in claim 1 wherein all the discharge openings are of essentially the same size and shape.

6. The slurry distributor as set forth in claim 1 wherein the valve means are interposed between the inlet and bypass means so as to block the direct flow of slurry therebetween.

7. The slurry distributor as set forth in claim 6 in which: the valve means are mounted with each compartment for vertical reciprocating movement between open and closed positions.

8. The slurry distributor as set forth in claim 6 in which: means comprising a vertically-disposed stationary guide tube is located within each compartment with its axis aligned with the center of the discharge opening; and, said valve means is guided for reciprocating telescopic movement within said guide tube.

9. The slurry distributor as set forth in claim 6 in which a functionally independent pneumatic servomotor is mounted within each compartment above the discharge opening therein, said servomotor being operatively connected to said valve means and effective upon actuation to at least open same.

10. The slurry distributor as set forth in claim 9 wherein an axially adjustable connection is interposed between said valve means and said servomotor, said connection being effective upon actuation to raise and lower the valve means so as to vary its seating pressure in closed position.

11. The slurry distributor as set forth in claim 6 in which: the valve means comprise tubular members open at the lower end thereof, said lower end comprising a downwardly and inwardly tapered portion.

12. The slurry distributor as set forth in claim 11 in which a rubber jacket covers the downwardly and inwardly tapered end portion of each valve.

13. The slurry distributor as set forth in claim 6 wherein each valve means is independently movable between an open position and a closed position seated within said discharge opening, the lower end of said valve means in open position being lower than the inlet opening and bypass means.

14. The slurry distributor as set forth in claim 1 wherein the bypass means in each compartment is positioned at a level substantially lower than the inlet thereto.

15. The slurry distributor as set forth in claim 1 wherein both the bypass means and inlet openings are spaced above the bottom of their respective compartments.

16. The slurry distributors set forth in claim 1 wherein the first and second wall means are cylindrical.

17. A stationary slurry distributor which comprises: a horizontally-disposed base; first wall means supported on said base cooperating therewith to define an open-topped reservoir effective to receive and retain a slurry delivered thereto; second wall means surrounding said first wall means in spaced relation outside thereof cooperating therewith and with said base to define an inner chamber encircling said reservoir; third wall means with an outlet therein surrounding said second wall means in spaced relation outside thereof cooperating therewith and with said base to define an outer chamber encircling said inner chamber; partition walls dividing the interior of said inner chamber into a plurality of individual compartments; the portions of said base underlying each compartment having a discharge opening therein, the portions of said first wall separating each compartment from the reservoir containing an inlet opening, the portions of said second wall within each compartment containing bypass means, and said bypass means and inlet opening within each compartment being angularly-offset relative to one another such that the slurry entering said compartment from the reservoir will essentially all leave the latter through said discharge opening when it is open; stopper-type valve means within each compartment independently operable to plug and unplug the discharge opening therein; and dam-forming means disposed within the outlet in the third wall means, said bypass means being effective to transfer slurry from said inner chamber to said outer chamber when the discharge opening within the compartment containing said bypass means is plugged, and said dam-forming means being of a height effective to discharge the contents of said outer chamber through the outlet without letting it re-enter said inner chamber.

18. A stationary slurry distributor which comprises: a horizontally-disposed base; first wall means supported on said base cooperating therewith to define an open-topped reservoir effective to receive and retain a slurry delivered thereto; second wall means surrounding said first wall means in spaced relation outside thereof cooperating therewith and with said base to define a chamber encircling said reservoir; partition walls wall dividing the interior of said chamber into separate compartments; the portions of said base underlying each compartment having a discharge opening therein, the portions of said first wall separating each compartment from the reservoir containing an inlet opening; a mounting plate bridging the gap between the first and second wall means above each compartment; and a vertically-disposed guide tube suspended from the underside of said mounting plate for horizontal adjustment relative thereto so as to place the axis thereof in alignment with the center of the discharge opening therein; and, stopper-type valve means mounted within said guide tube for reciprocating movement therein between an open position and a closed position plugging said discharge opening independently operable to plug and unplug the discharge opening therein.

19. The slurry distributor as set forth in claim 18 in which: the mounting plate has an opening therein adjacent the inside wall of the guide tube; and, in which the valve means carries a vertically-disposed indicator rod movable therewith, said rod projecting up through said opening in the mounting plate providing a visible indication of whether said valve means is open or closed.

* * * * *